United States Patent
Cho et al.

(10) Patent No.: US 10,285,024 B2
(45) Date of Patent: May 7, 2019

(54) APPARATUS AND METHOD FOR MULTI-TERMINAL COMMUNICATION SERVICE

(71) Applicant: SK Telecom Co., Ltd., Seoul (KR)

(72) Inventors: Ilkwon Cho, Seoul (KR); Young Kung Kim, Seoul (KR); Sang Kyun Ahn, Seoul (KR); Yong Sug Jang, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 31 days.

(21) Appl. No.: 15/466,124

(22) Filed: Mar. 22, 2017

(65) Prior Publication Data

US 2017/0195861 A1 Jul. 6, 2017

Related U.S. Application Data

(63) Continuation of application No. PCT/KR2015/001119, filed on Feb. 3, 2015.

(30) Foreign Application Priority Data

Sep. 22, 2014 (KR) .......................... 10-2014-0126096

(51) Int. Cl.
*H04M 3/42* (2006.01)
*H04M 1/725* (2006.01)
(Continued)

(52) U.S. Cl.
CPC ........... *H04W 4/16* (2013.01); *H04M 1/7253* (2013.01); *H04M 3/42263* (2013.01);
(Continued)

(58) Field of Classification Search
CPC . H04B 7/024; H04B 7/0413; H04W 36/0005; H04W 36/20; H04M 1/7253
See application file for complete search history.

(56) References Cited

U.S. PATENT DOCUMENTS

| 2004/0207719 A1* | 10/2004 | Tervo | H04M 1/7253 348/14.02 |
| 2008/0130848 A1* | 6/2008 | Elumalai | H04L 12/12 379/110.01 |

(Continued)

FOREIGN PATENT DOCUMENTS

| KR | 1998-085247 A | 12/1998 |
| KR | 10-2005-0023015 A | 3/2005 |

(Continued)

OTHER PUBLICATIONS

International Search Report dated Jun. 19, 2015 corresponding to International Application PCT/KR2015/001119.

*Primary Examiner* — Raj Jain
(74) *Attorney, Agent, or Firm* — Hauptman Ham, LLP

(57) ABSTRACT

An apparatus for multi-terminal communication service includes a service determination unit configured to determine use or non-use of a mobile communication service by a main communication terminal or an auxiliary communication terminal corresponding to the main communication terminal, a terminal determination unit configured to determine a communication terminal among the main communication terminal and the auxiliary communication terminal, which does not use the mobile communication service, and a service changing unit configured to change a type of the mobile communication service to be provided to the determined communication terminal. The mobile communication service includes a data communication service and the use or non-use of the data communication service is determined based on information from a DPI (Deep Packet Inspection) or a charging device.

13 Claims, 8 Drawing Sheets

(51) Int. Cl.
*H04W 4/16* (2009.01)
*H04W 60/00* (2009.01)
*H04W 88/18* (2009.01)
*H04B 7/024* (2017.01)

(52) U.S. Cl.
CPC ........... *H04W 60/00* (2013.01); *H04W 88/18* (2013.01); *H04B 7/024* (2013.01)

(56) References Cited

U.S. PATENT DOCUMENTS

| | | | | |
|---|---|---|---|---|
| 2008/0250408 | A1* | 10/2008 | Tsui | H02J 7/0055 718/100 |
| 2009/0178127 | A1* | 7/2009 | Ogino | G06F 21/34 726/7 |
| 2010/0027471 | A1* | 2/2010 | Palanki | H04B 7/024 370/328 |
| 2012/0066708 | A1* | 3/2012 | Lee | G06Q 30/02 725/31 |
| 2017/0195861 | A1* | 7/2017 | Cho | H04W 4/16 |

FOREIGN PATENT DOCUMENTS

| | | |
|---|---|---|
| KR | 10-2007-0120249 A | 12/2007 |
| KR | 10-2011-0006201 A | 1/2011 |

\* cited by examiner

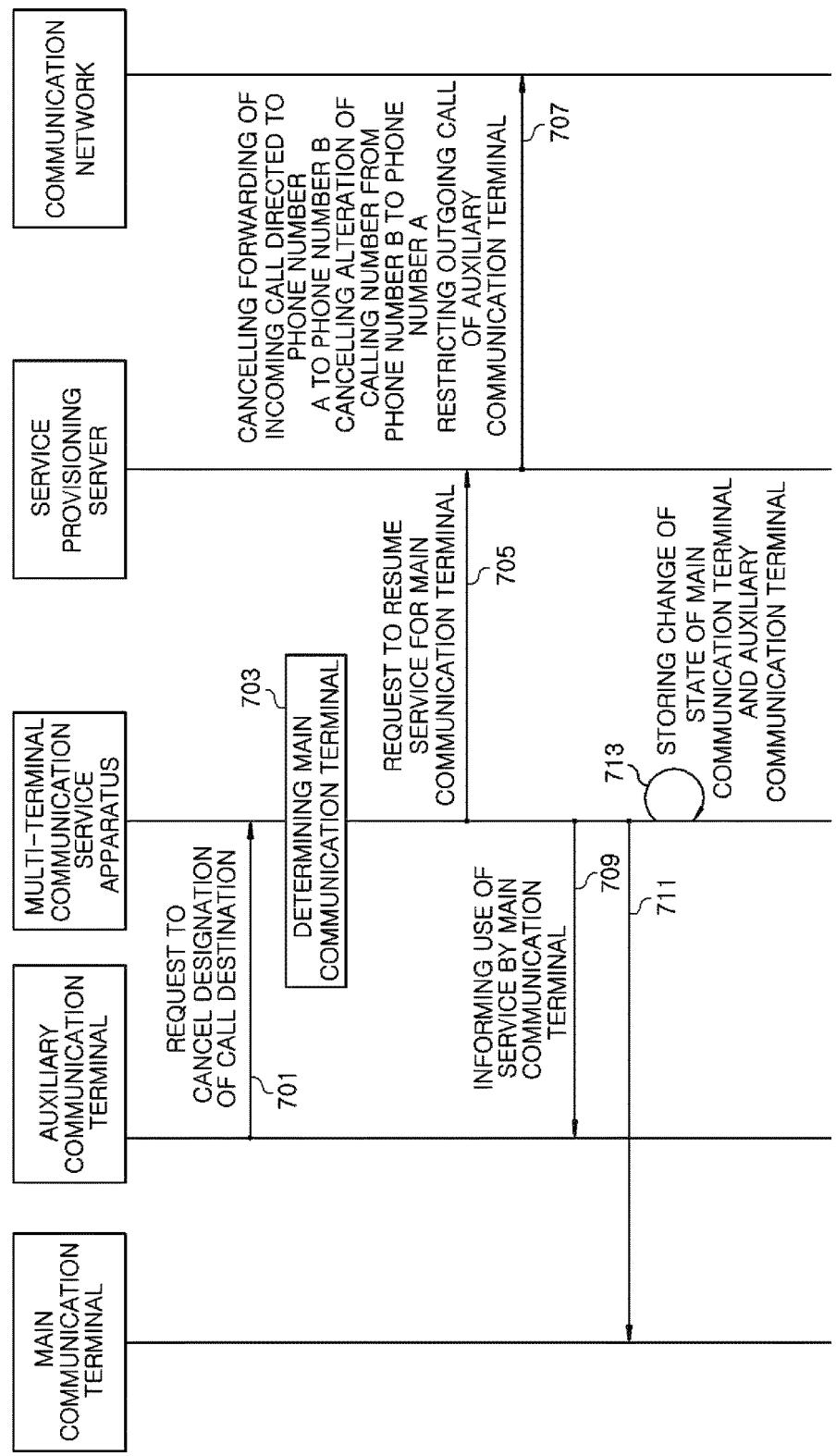

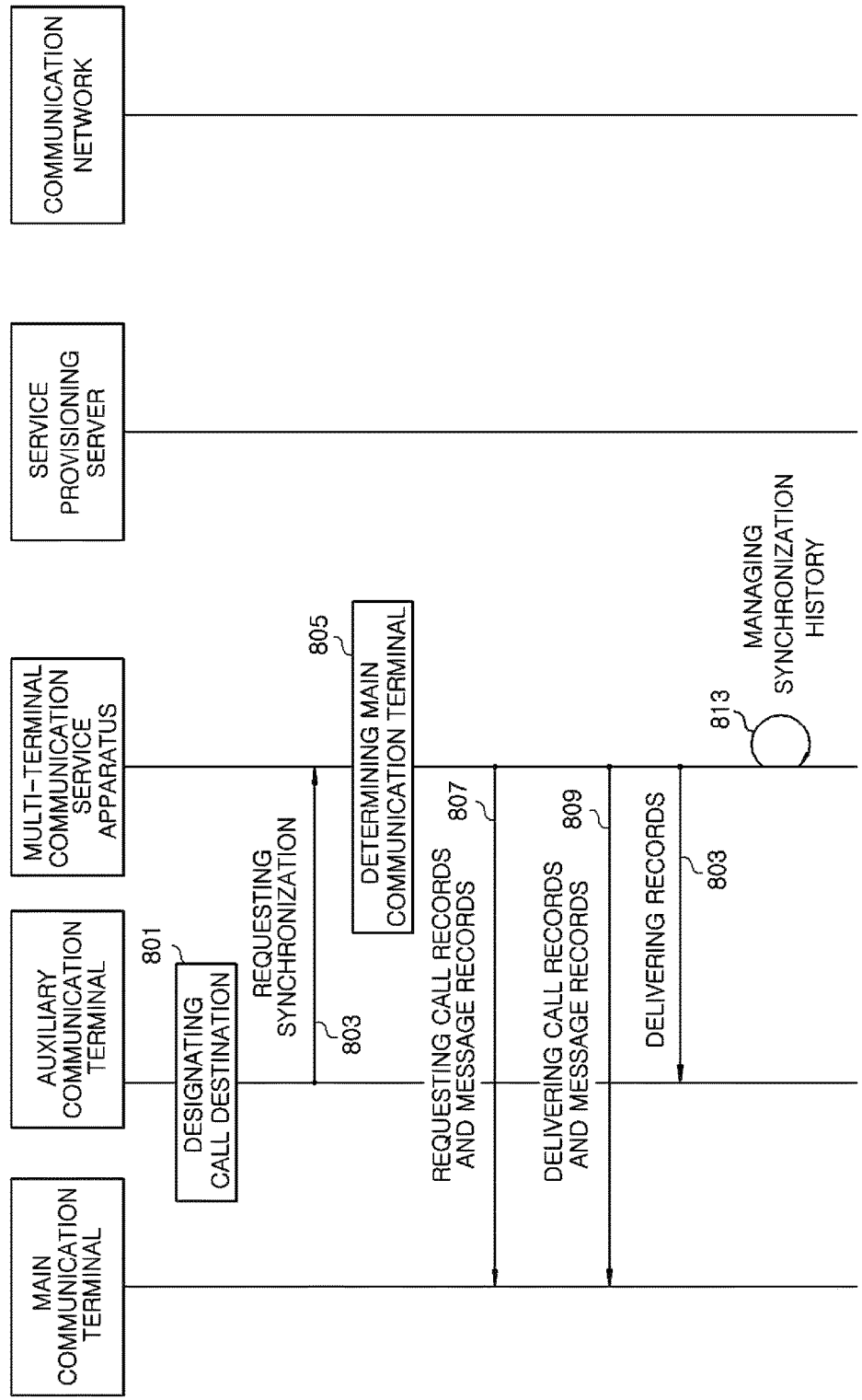

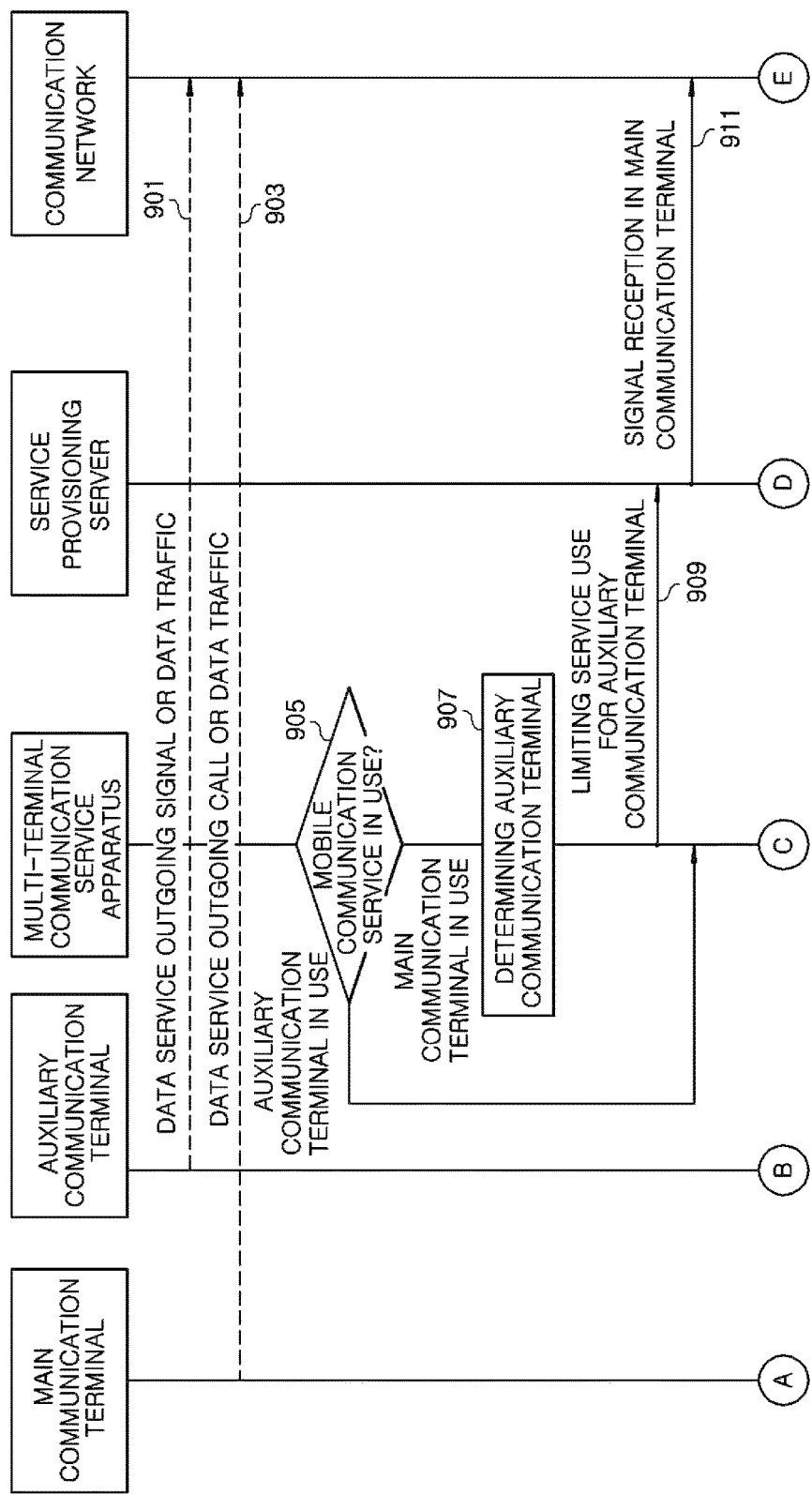

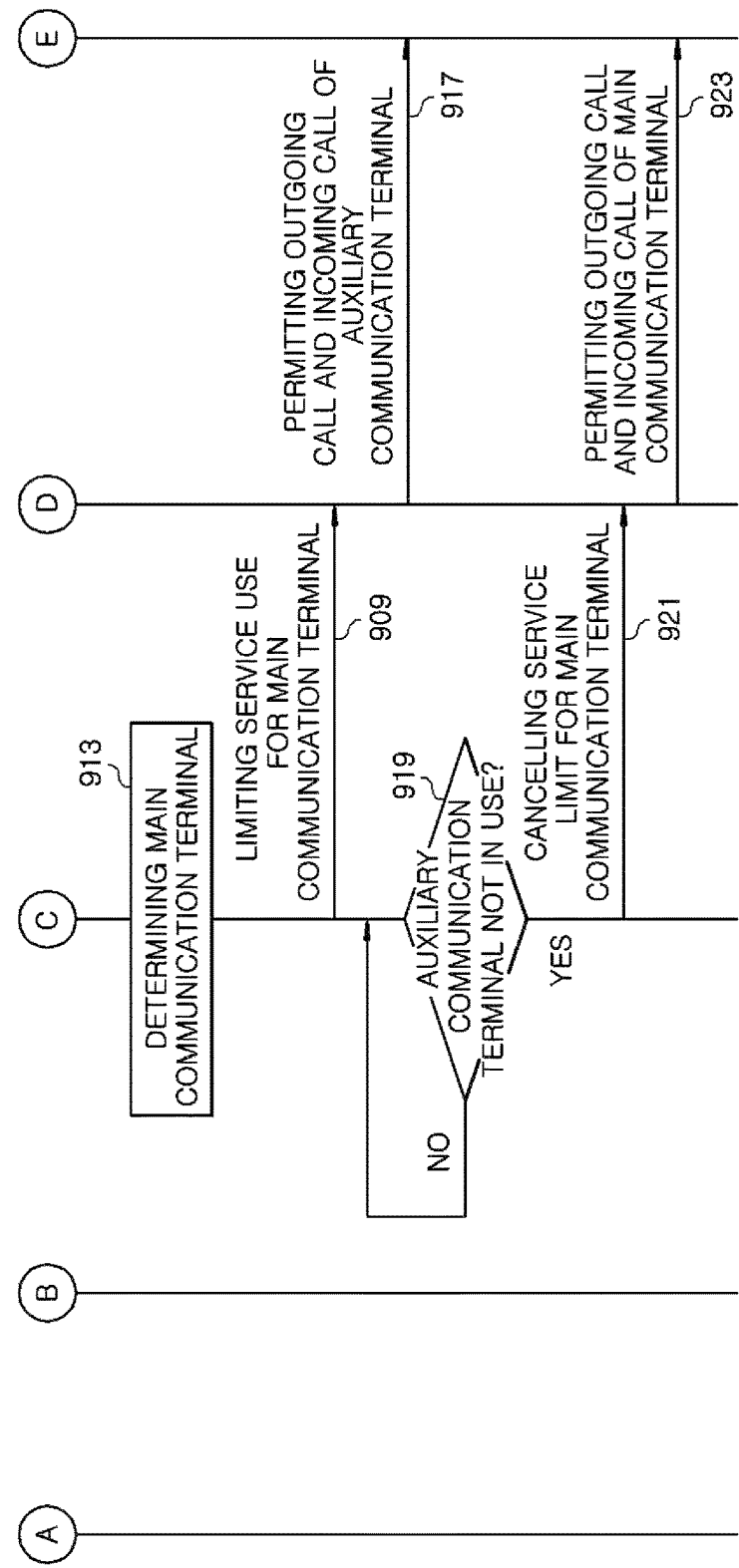

APPARATUS AND METHOD FOR MULTI-TERMINAL COMMUNICATION SERVICE

CROSS-REFERENCE TO RELATED APPLICATIONS

The present application is a continuation of International Patent Application No. PCT/KR2015/001119, filed on Feb. 3, 2015, which claims priorities to and benefit of Korean Patent Application No. 10-2014-0126096, filed on Sep. 22, 2014. The disclosures of the above-listed applications are hereby incorporated by reference herein in their entirety.

TECHNICAL FIELD

The present disclosure relates to a multi-terminal communication service apparatus and method and, more particularly, to a multi-terminal communication service apparatus and method for providing a communication service to a main communication terminal and at least one auxiliary communication terminal.

BACKGROUND

In general, one phone number is allocated to one communication terminal in the same mobile communication network. In the case of using two communication terminals, it is usual that two phone numbers are respectively allocated to the two communication terminals. One phone number may be allocated to two communication terminals in some cases.

As a prior art of providing a communication service to multiple terminals, a control method for providing a single-number service in a communication network is disclosed in Korean Patent Application Publication No. 1998-085247 (published on Dec. 5, 1998).

However, in such a prior art, it is necessary to separately assign and register a single number which integrates the numbers allocated to a plurality of communication terminals owned by a subscriber. This leads to a waste of phone number resources.

In the meantime, such a communication terminal has evolved into a device capable of executing advanced computing operations, by virtue of the dramatic development of information technology (IT). The communication terminal standing at the center of such evolution is called a smartphone.

A mobile operating system such as Android, i-OS (Operating System), Windows Mobile, etc. is mounted on the smartphone. Various application programs running on the mobile operating system can be installed in the smartphone. Thus, users utilize the smartphone for different purposes.

In addition, the communication terminal such as a smartphone or the like can be interlocked with various peripheral devices. Recently, a great deal of attention is paid to a wearable terminal which can be worn in the form of a watch or a bracelet or in the form of eyeglasses and which can detect biological rhythm through various sensors such as an acceleration sensor or the like and can transmit information on the detected biological rhythm to a computing terminal such as a smartphone or the like.

Even in the case where such a wearable terminal has a function of using a mobile communication network by itself, the wearable terminal is frequently used as an auxiliary communication terminal which is dependent on a main communication terminal such as a smartphone or the like. In the case where the auxiliary communication terminal carries out communication including transmission and reception using a mobile communication network, it is necessary to connect the auxiliary communication terminal to the main communication terminal via a Near-field communication or the like. Thus, there is a drawback in that the auxiliary communication terminal has to perform communication via the main communication terminal.

In order to solve this drawback, it is necessary to allocate another phone number to the wearable terminal so that the wearable terminal can use a mobile communication network by itself. In this case, however, there is problem in that due to the use of a phone number different from that of a main communication terminal such as a smartphone or the like, the wireless communication resources for mobile communication services are additionally consumed in proportion thereto.

SUMMARY

Embodiments of the present disclosure provide a multi-terminal communication service apparatus and method capable of, when providing a mobile communication service to a main communication terminal and at least one auxiliary communication terminal, providing the mobile communication service only to the auxiliary communication terminal regardless of the main communication terminal and capable of mutually exclusively operating the main communication terminal and the auxiliary communication terminal so that the main communication terminal and the auxiliary communication terminal do not individually occupy wireless communication resources for a mobile communication service.

The problems to be solved are not limited to the mentioned ones in the present disclosure and the other problems which are not mentioned are included and they can be clearly understood by those skilled in the art from the following descriptions.

In accordance with an embodiment of the present disclosure, an apparatus for multi-terminal communication service, comprising a service determination unit configured to determine use or non-use of a mobile communication service by a main communication terminal or an auxiliary communication terminal corresponding to the main communication terminal, a terminal determination unit configured to determine a communication terminal among the main communication terminal and the auxiliary communication terminal, which does not use the mobile communication service, and a service changing unit configured to change a type of the mobile communication service to be provided to the determined communication terminal, wherein the mobile communication service includes a data communication service and the use or non-use of the data communication service is determined based on information from a DPI (Deep Packet Inspection) or a charging device.

In accordance with another embodiment of the present disclosure, a method for multi-terminal communication service performed by a processor of an apparatus for the multi-terminal communication service, the method comprising determining use or non-use of a mobile communication service by a main communication terminal or an auxiliary communication terminal corresponding to the main communication terminal, determining a communication terminal among the main communication terminal and the auxiliary communication terminal, which does not use the mobile communication service, and changing a type of the mobile communication service to be provided to the determined communication terminal, wherein the mobile communication service includes a data communication service and the use or non-use of the data communication service is determined based on information from a DPI (Deep Packet Inspection) or a charging device.

According to the embodiment of the present disclosure, when providing a mobile communication service to a main communication terminal and at least one auxiliary communication terminal, the mobile communication service can be provided only to the auxiliary communication terminal regardless of the main communication terminal. The main communication terminal and the auxiliary communication terminal are mutually exclusively operated. Thus, the main communication terminal and the auxiliary communication terminal do not individually occupy wireless communication resources for a mobile communication service.

Accordingly, even if the auxiliary communication terminal is additionally operated, wireless communication resources for mobile communication services are not additionally consumed as compared with a case where only the main communication terminal is operated.

For example, during exercise and outdoor/leisure activities, a smartphone is inconvenient to carry and may be damaged by inundation, falling, etc. However, a wearable terminal having an independent mobile communication function is more convenient to carry and is less likely to be damaged by inundation, falling, etc. When utilizing the smartphone as the main communication terminal and utilizing the wearable terminal as the auxiliary communication terminal, according to the present disclosure, the wearable terminal can independently provide a mobile communication service even if the smartphone is not carried.

In addition, by using the phone number of the main communication terminal when the auxiliary communication terminal takes the place of the main communication terminal, it is possible to maintain the convenience in use related to the same phone number. By limiting the outgoing call of the main communication terminal, it is possible to prevent in advance the generation of unnecessary communication charges and the possibility of unauthorized use of the main communication terminal by others.

BRIEF DESCRIPTION OF THE DRAWINGS

FIGS. 3 to 7B are flowcharts for explaining a communication service method implemented by the multi-terminal communication service apparatus according to an embodiment of the present disclosure.

DETAILED DESCRIPTION

The advantages and features of exemplary embodiments of the present disclosure and methods of accomplishing them will be clearly understood from the following description of the embodiments taken in conjunction with the accompanying drawings. However, the present disclosure is not limited to those embodiments and is implemented in various forms. It is noted that the embodiments are provided to make a full disclosure and also to allow those skilled in the art to know the full scope of the present disclosure.

In the following description, well-known functions and/or configurations will not be described in detail if they would unnecessarily obscure the features of the disclosure. Further, the terms to be described below are defined in consideration of their functions in the embodiments of the disclosure and vary depending on a user's or operator's intention or practice. Accordingly, the definition is made on a basis of the content throughout the present disclosure.

Figure 1:
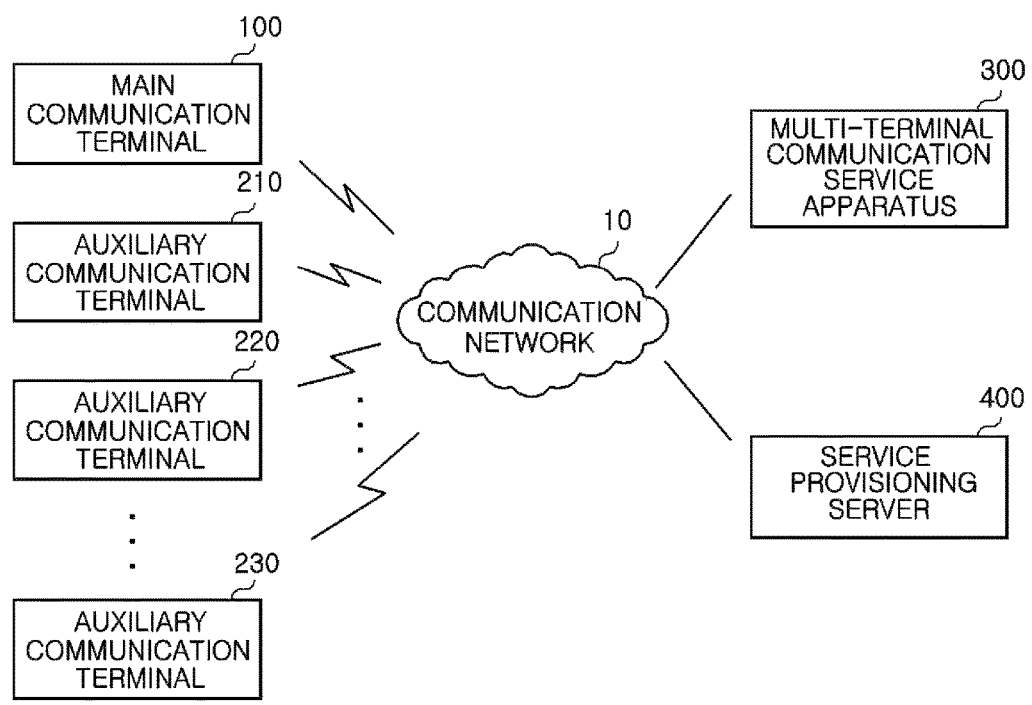
FIG. 1 is a configuration diagram of a mobile communication service network including a multi-terminal communication service apparatus according to an embodiment of the present disclosure.

FIG. 1 is a configuration diagram of a mobile communication service network including a multi-terminal communication service apparatus according to an embodiment of the present disclosure.

As will be described below, in the mobile communication service network according to the present embodiment, a main communication terminal 100, a plurality of auxiliary communication terminals 210, 220 and 230, a multi-terminal communication service apparatus 300, a service provisioning server 400 and the like may be connected via a communication network 10.

The communication network 10 may be realized by using, independently or in combination, various mobile communication systems such as an LTE (Long Term Evolution) communication system using an EPC (Evolved Packet Core) network, a WCDMA (Wideband Code Division Multiple Access) communication system, a GSM (Global System for Mobile) communication system, a CDMA (Code Division Multiple Access) communication system, a TDMA (Time Division Multiple Access) communication system and the like.

The main communication terminal 100 and the auxiliary communication terminals 210, 220 and 230 may be realized by mobile communication terminals equipped with a modem chip for mobile communication, such as a smartphone, a wearable terminal, a notepad, a tablet computer, a navigation device, a black box for motor vehicles, a notebook computer, a camera and the like. For example, the main communication terminal 100 may be realized by a smartphone which has a relatively high computing capacity. The auxiliary communication terminals 210, 220 and 230 may be realized by a wearable terminal having relatively high portability. The number of auxiliary communication terminals shown in FIG. 1 may be increased or decreased.

The multi-terminal communication service apparatus 300 is configured to, when providing a mobile communication service to the main communication terminal 100 and the auxiliary communication terminals 210, 220 and 230, provide the mobile communication service to the auxiliary communication terminals 210, 220 and 230 regardless of the main communication terminal 100 and is configured to mutually exclusively operate the main communication terminal 100 and the auxiliary communication terminals 210, 220 and 230 so that the main communication terminal 100 and the auxiliary communication terminals 210, 220 and 230 do not individually occupy wireless communication resources for a mobile communication service. The multi-terminal communication service apparatus 300 will be described below with reference to FIG. 2.

The service provisioning server 400 serves to manage the service use of the communication network 10 and controls the communication network 10 so that a mobile communication service is provided to one of the main communication terminal 100 and the auxiliary communication terminals 210, 220 and 230 in response to the request of the multi-terminal communication service apparatus 300.

In the embodiment shown in FIG. 1, the service provisioning server 400 is realized independently from the multi-terminal communication service apparatus 300 so that the service provisioning server 400 and the multi-terminal communication service apparatus 300 can work together. Alternatively, the multi-terminal communication service apparatus 300 and the service provisioning server 400 may be realized as a single unit. For example, the multi-terminal communication service apparatus 300 may include the service provisioning server 400.

Figure 2:
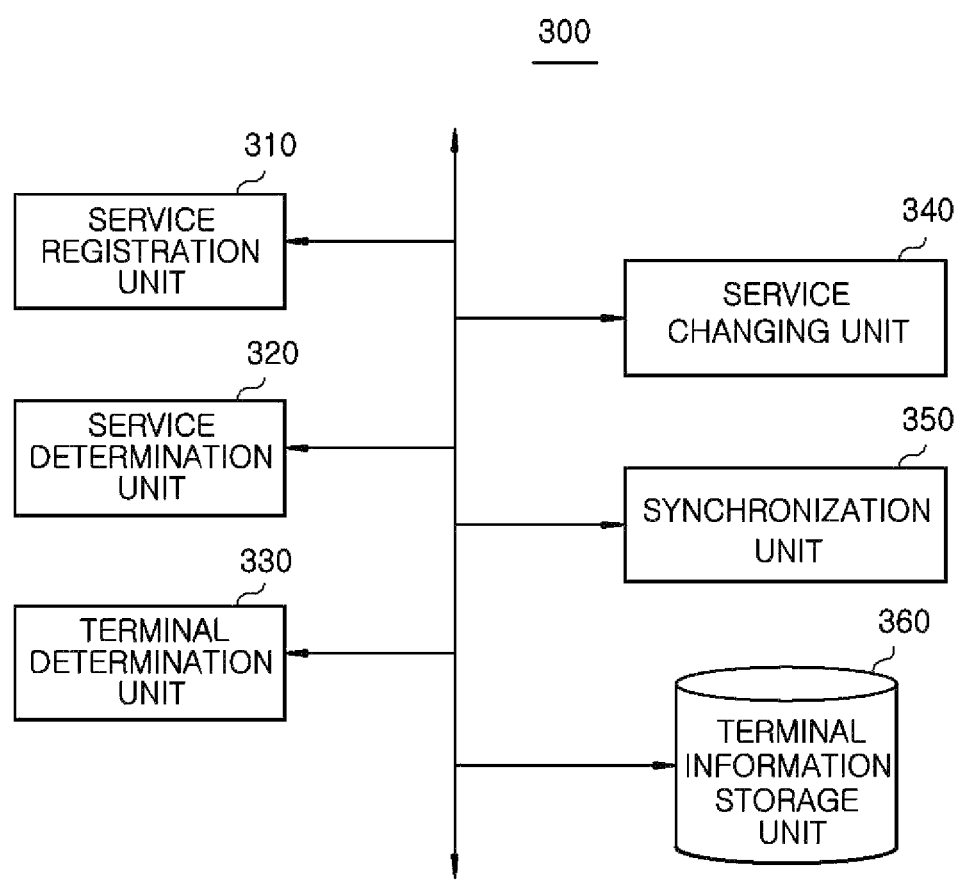
FIG. 2 is a detailed block diagram of the multi-terminal communication service apparatus according to an embodiment of the present disclosure.

FIG. 2 is a detailed block diagram of the multi-terminal communication service apparatus according to an embodiment of the present disclosure.

As shown in FIG. 2, the multi-terminal communication service apparatus 300 according to the present embodiment includes a service registration unit 310, a service determination unit 320, a terminal determination unit 330, a service changing unit 340, a synchronization unit 350 and a terminal information storage unit 360.

The service registration unit 310 registers in advance the identification information of the main communication terminal 100 and the identification information of the auxiliary communication terminals 210, 220 and 230 in association with each other. A mobile communication service is mutually exclusively provided to the main communication terminal 100 and the auxiliary communication terminals 210, 220 and 230.

The service determination unit 320 determines the use or non-use of a mobile communication service by the main communication terminal 100 or the auxiliary communication terminals 210, 220 and 230 corresponding to the main communication terminal 100. For example, the service determination unit 320 may determine the use or non-use of a mobile communication service according to a call reception designation request by the main communication terminal 100 or the auxiliary communication terminals 210, 220 and 230. The mobile communication service may include a data communication service. In addition, when a data service outgoing call or data traffic of the main communication terminal 100 and the auxiliary communication terminals 210, 220 and 230 is detected, the service determination unit 320 determines that a data communication service is being used.

The terminal determination unit 330 determines a communication terminal among the main communication terminal 100 and the auxiliary communication terminal 210, 220 or 230, which does not use the mobile communication service. That is to say, if it is determined that the auxiliary communication terminal 210, 220 or 230 is using the mobile communication service, the terminal determination unit 330 determines the main communication terminal 100 pre-registered in association with the auxiliary communication terminal 210, 220 or 230 as a communication terminal which does not use the mobile communication service. If it is determined that the main communication terminal 100 is using the mobile communication service, the terminal determination unit 330 determines the auxiliary communication terminal 210, 220 or 230 pre-registered in association with the main communication terminal 100 as a communication terminal which does not use the mobile communication service.

The service changing unit 340 is configured to change a type of the mobile communication service to be provided to the communication terminal determined by the terminal determination unit 330. That is to say, the service changing unit 340 changes the type the mobile communication service provided to the main communication terminal 100 or the auxiliary communication terminal 210, 220 or 230 pre-registered in association with the main communication terminal determined to be do not use the mobile communication service. When the non-use of the mobile communication service in the main communication terminal 100 is determined, the service changing unit 340 may forward an incoming call directed to a phone number allocated to the main communication terminal 100 to a phone number allocated to the auxiliary communication terminal 210, 220 or 230. Furthermore, the service changing unit 340 may alter a calling number of an outgoing call generated from the auxiliary communication terminal 210, 220 or 230 to a phone number allocated to the main communication terminal 100. When the non-use of the mobile communication service in the auxiliary communication terminal 210, 220 or 230 is determined by the service determination unit 320 while changing or limiting the use of the mobile communication service in the main communication terminal 100, the service changing unit 340 may resume the provision of the mobile communication service to the main communication terminal 100.

The synchronization unit 350 matches call records or message records of the main communication terminal 100 to those of the auxiliary communication terminal 210, 220 or 230 respectively when the type of the mobile communication service provided to the main communication terminal 100 or the auxiliary communication terminal 210, 220 or 230 has been changed or limited.

The terminal information storage unit 360 is configured to associate in pair and store the identification information of the main communication terminal 100 and the identification information of the auxiliary communication terminal 210, 220 or 230 pre-registered by the service registration unit 310 for a mutually exclusive mobile communication service. In addition, according to the operation of the service changing unit 340, the terminal information storage unit 360 stores incoming call forwarding information and calling number alteration information.

FIGS. 3 to 7 are flowcharts for explaining a communication service method implemented by the multi-terminal communication service apparatus according to an embodiment of the present disclosure.

Figure 3:
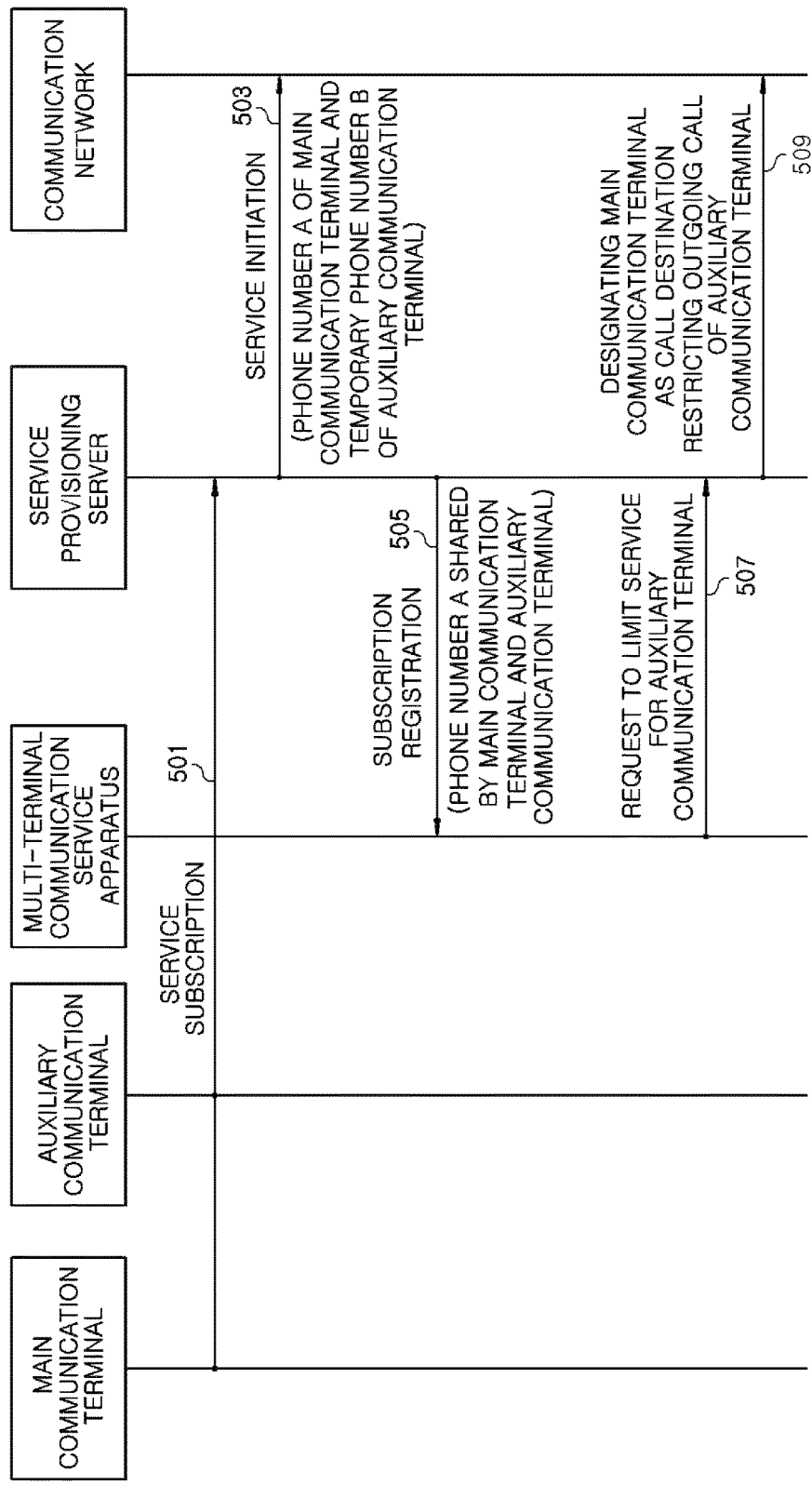

FIG. 3 is a flowchart showing a procedure of performing pre-registration after service initiation in order to provide a mutually exclusive mobile communication service to the main communication terminal and the auxiliary communication terminals according to the embodiment of the present disclosure.

First, the main communication terminal 100 and the auxiliary communication terminals 210, 220 and 230 are connected to the service provisioning server 400 through the communication network 10 to request subscription to the mutually exclusive mobile communication service according to the embodiment of the present disclosure (501).

Then, the service provisioning server 400 carries out a service initiation procedure with respect to the main communication terminal 100 and the auxiliary communication terminals 210, 220 and 230 through the communication network 10 or the like. At this time, phone number A may be given to the main communication terminal 100. Temporary phone number B may be given to the auxiliary communication terminals 210, 220 and 230. In this regard, a user of the main communication terminal 100 and the auxiliary communication terminals 210, 220 and 230 may not recognize the temporary phone number B (503).

Subsequently, the service provisioning server 400 requests the multi-terminal communication service apparatus 300 to subscribe and register in advance the pair of the main communication terminal 100 and the auxiliary communication terminals 210, 220 and 230 as a target of a mutually exclusive mobile communication service.

Then, the service registration unit 310 of the multi-terminal communication service apparatus 300 associates and registers in advance the identification information of the main communication terminal 100 and the identification information of the auxiliary communication terminals 210, 220 and 230, wherein the mobile communication service is mutually exclusively provided to the main communication terminal 100 and the auxiliary communication terminals 210, 220 and 230. The terminal information storage unit 360 associates in pair and stores the identification information of the main communication terminal 100 and the identification information of the auxiliary communication terminals 210, 220 and 230 pre-registered by the service registration unit 310 for the mutually exclusive mobile communication service. At this time, the main communication terminal 100 and the auxiliary communication terminals 210, 220 and 230 may be set and pre-registered so as to share the phone number A given in step 503 (505).

In this case, the multi-terminal communication service apparatus 300 requests the service provisioning server 400 to change or limit the type of the mobile communication service to the auxiliary communication terminals 210, 220 and 230 without changing or limiting the type of the mobile communication service to the main communication terminal 100. At this time, the multi-terminal communication service apparatus 300 may request the service provisioning server 400 to designate the main communication terminal 100 as a call destination and to restrict outgoing call from the auxiliary communication terminals 210, 220 and 230 (507).

Then, the service provisioning server 400 sets a state for restricting the outgoing call through the communication network 10 with respect to the auxiliary communication terminals 210, 220 and 230 and sets the main communication terminal 100 so as to be able to perform phone conversation and message/data communication. At this time, the terminal information storage unit 360 of the multi-terminal communication service apparatus 300 may record and manage information on the state for restricting the outgoing call with respect to the main communication terminal 100 and the auxiliary communication terminals 210, 220 and 230 (509).

Figure 4:
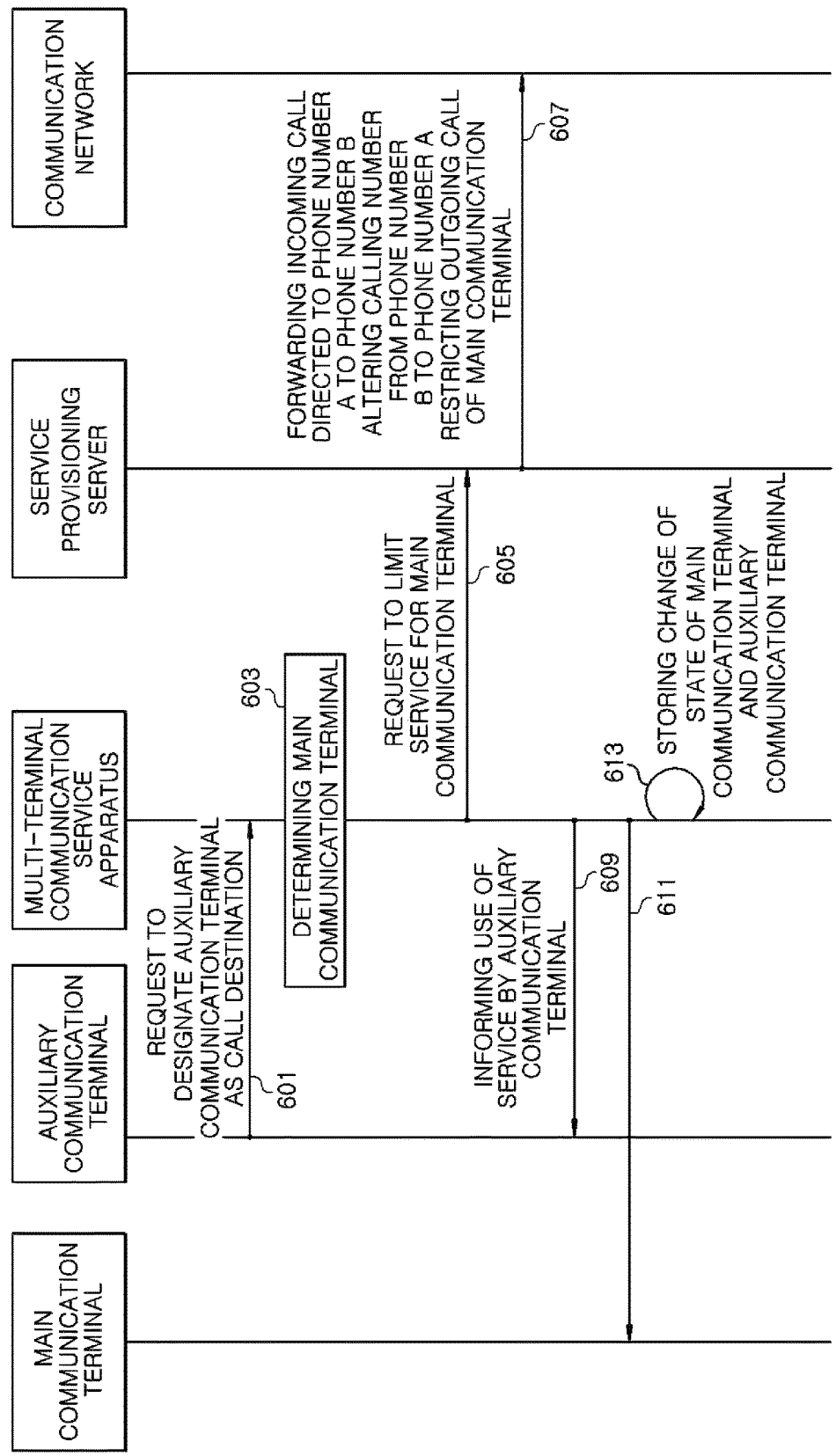

FIG. 4 is a flowchart showing a procedure of changing or limiting the provision of the mobile communication service to the main communication terminal according to the embodiment of the present disclosure.

First, the multi-terminal communication service apparatus 300 determines the use or non-use of the mobile communication service by the auxiliary communication terminal 210, 220 or 230 according to the call reception designation request to the pre-registered auxiliary communication terminal 210, 220 or 230. That is to say, if one of the auxiliary communication terminals 210, 220 and 230 is connected to the multi-terminal communication service apparatus 300 via the communication network 10 to request a call reception designation, the service determination unit 320 of the multi-terminal communication service apparatus 300 determines that the auxiliary communication terminal 210, 220 or 230 is using the mobile communication service. In this regard, even when a data service outgoing call or data traffic is generated by the auxiliary communication terminal 210, 220 or 230, the service determination unit 320 may determine that the auxiliary communication terminal 210, 220 or 230 is using the mobile communication service (601).

Then, the terminal determination unit 330 of the multi-terminal communication service apparatus 300 searches for the identification information of the main communication terminal 100 and the auxiliary communication terminals 210, 220 and 230 pre-registered and stored in pair in the terminal information storage unit 360. Based on the search result, the terminal determination unit 330 determines the main communication terminal 100 pre-registered in association with the auxiliary communication terminals 210, 220 and 230 (603).

Next, the service changing unit 340 of the multi-terminal communication service apparatus 300 requests the service provisioning server 400 to change or limit the use of the mobile communication service by the main communication terminal 100 which has been determined to be registered in association with the auxiliary communication terminals 210, 220 and 230. For example, the service changing unit 340 requests the service provisioning server 400 to restrict outgoing call of the main communication terminal 100 and requests the service provisioning server 400 to forward incoming call to one of the auxiliary communication terminals 210, 220 and 230 designated in step 601 (605).

Then, the service provisioning server 400 sets a state for restricting the outgoing call through the communication network 10 with respect to the main communication terminal 100 and sets one of the auxiliary communication terminals 210, 220 and 230 designated in step 601 so as to be able to perform phone conversation and message/data communication. At this time, the restriction of the outgoing call of the main communication terminal 100 may be targeted for all or a part of services including a phone conversation service, an SMS (Short Message Service), an MMS (Multimedia Message Service) and a data service. For example, the data service, which has nothing to do with a phone number, may be permitted if such a need arises. In this case, it may be possible to implement a calling plan in such a way that the data use amount is shared by the main communication terminal 100 and the auxiliary communication terminals 210, 220 and 230.

In this case, according to the request of the service changing unit 340, the service provisioning server 400 forwards an incoming call directed to the phone number A allocated to the main communication terminal 100 to the temporary phone number B allocated to the auxiliary communication terminal 210, 220 or 230. Furthermore, the service changing unit 340 alters the calling number of an outgoing call generated from the temporary phone number B allocated to the auxiliary communication terminal 210, 220 or 230 to the phone number A allocated to the main communication terminal 100. The forwarding of the incoming call and the calling number alteration may be targeted for the services such as a phone conversation service, an SMS, an MMS and the like (607).

In addition, the multi-terminal communication service apparatus 300 informs the main communication terminal 100 and the auxiliary communication terminals 210, 220 and 230 that one of the auxiliary communication terminals 210, 220 and 230 designated in step 601 is using the mobile communication service (609 and 611).

The terminal information storage unit 360 may store, record and manage the service state information which indicates the state of limiting the use of the mobile communication service in the main communication terminal 100 (613).

FIG. 5 is a flowchart showing a procedure of resuming the provision of the mobile communication service to the main communication terminal according to the embodiment of the present disclosure.

First, the multi-terminal communication service apparatus 300 determines the use or non-use of the mobile communication service by the auxiliary communication terminal 210, 220 or 230 in response to the request of cancelling the call reception designation to the pre-registered auxiliary communication terminal 210, 220 or 230. That is to say, if one of the auxiliary communication terminals 210, 220 and 230 is connected to the multi-terminal communication service apparatus 300 via the communication network 10 to request cancellation of the call reception designation, the service determination unit 320 of the multi-terminal communication service apparatus 300 determines that the auxiliary communication terminals 210, 220 and 230 are not in use. In this regard, even when a data service outgoing call or data traffic is generated by the auxiliary communication terminal 210, 220 or 230, the service determination unit 320 may determine that the auxiliary communication terminal 210, 220 or 230 is using the mobile communication service (701).

Then, the terminal determination unit 330 of the multi-terminal communication service apparatus 300 searches for the identification information of the main communication terminal 100 and the auxiliary communication terminals 210, 220 and 230 pre-registered and stored in pair in the terminal information storage unit 360. Based on the search result, the terminal determination unit 330 determines the main communication terminal 100 pre-registered in association with the auxiliary communication terminals 210, 220 and 230 (703).

Next, the service changing unit 340 of the multi-terminal communication service apparatus 300 requests the service provisioning server 400 to resume the use of the mobile communication service by the main communication terminal 100 which has been determined to be registered in association with the auxiliary communication terminals 210, 220 and 230. That is to say, the service changing unit 340 requests the service provisioning server 400 to cancel the restriction of the outgoing call and permit the call reception with respect to the main communication terminal 100. The service changing unit 340 requests the service provisioning server 400 to cancel the forwarding of the incoming call to one of the auxiliary communication terminals 210, 220 and 230 (705).

Then, the service provisioning server 400 sets a state of restriction of outgoing call through the communication network 10 with respect to the auxiliary communication terminals 210, 220 and 230 and sets the main communication terminal 100 so as to be able to perform phone conversation and message/data communication.

In response to the request of the service changing unit 340, the service provisioning server 400 cancels the forwarding of the incoming call by which the incoming call directed to the phone number A allocated to the main communication terminal 100 has been forwarded to the temporary phone number B allocated to the auxiliary communication terminal 210, 220 or 230. Furthermore, the service provisioning server 400 cancels the number alteration by which the calling number of the outgoing call generated from the temporary phone number B allocated to the auxiliary communication terminal 210, 220 or 230 has been altered to the phone number A allocated to the main communication terminal 100. The cancellation of the forwarding of the incoming call and the cancellation of calling number alteration may be targeted for the services such as a phone conversation service, an SMS, an MMS and the like. At this time, the outgoing call and the incoming call of the main communication terminal 100 is permitted and the outgoing call of the auxiliary communication terminal 210, 220 or 230 is restricted. Such restriction of the outgoing call may be targeted for all or a part of services including a phone conversation service, an SMS, an MMS and a data service. For example, the data service, which has nothing to do with a phone number, may be permitted if such a need arises (707).

In addition, the multi-terminal communication service apparatus 300 informs the main communication terminal 100 and the auxiliary communication terminals 210, 220 and 230 that the main communication terminal 100 is using the mobile communication service (709 and 711).

The terminal information storage unit 360 may store, record and manage the service state information which indicates the state of limiting the use of the mobile communication service in the auxiliary communication terminals 210, 220 and 230 (713).

FIG. 6 is a flowchart showing a procedure of matching call records or message records of the main communication terminal and the auxiliary communication terminals on the basis of the changing or limiting time of the mobile communication service according to the embodiment of the present disclosure.

First, if the forwarding of the incoming call by which the incoming call directed to the phone number A allocated to the main communication terminal 100 is forwarded to the temporary phone number B allocated to the auxiliary communication terminal 210, 220 or 230 is designated as described in step 607 with reference to FIG. 4 (801), the auxiliary communication terminal 210, 220 or 230 requests the multi-terminal communication service apparatus 300 to synchronize the call records and/or the message records (803).

Then, the terminal determination unit 330 of the multi-terminal communication service apparatus 300 searches for the identification information of the main communication terminal 100 and the auxiliary communication terminals 210, 220 and 230 pre-registered and stored in pair in the terminal information storage unit 360. Based on the search result, the terminal determination unit 330 determines the main communication terminal 100 pre-registered in association with the auxiliary communication terminals 210, 220 and 230 (803).

Then, the synchronization unit 350 of the multi-terminal communication service apparatus 300 requests the determined main communication terminal 100 to send call records and/or message records and receives the call records and/or message records from the main communication terminal 100. In this case, the synchronization unit 350 may request the main communication terminal 100 to send only the call records and/or message records available after latest synchronization time based on the synchronization history information pre-stored in the terminal information storage unit 360 and may receive the records after the latest synchronization time. Alternatively, the synchronization unit 350 may request and receive the call records and/or message records on the basis of the changing or limiting time of the mobile communication service of the main communication terminal 100 by step 607 in FIGS. 4 (807 and 809).

Next, the synchronization unit 350 delivers the call records and/or message records received from the main communication terminal 100 to the auxiliary communication terminal designated in step 801 so as to match the call records and/or message records of the main communication terminal 100 and one of the auxiliary communication terminals 210, 220 and 230 designated in step 801 (811).

The terminal information storage unit 360 may store, record and manage the synchronization history information which indicates the synchronization history of the call records and/or message records delivered in step 811 (813).

FIGS. 7A and 7B are a flowchart showing a procedure in which the multi-terminal communication service apparatus actively grasps the service of the main communication terminal and the auxiliary communication terminals and mutually exclusively operates the main communication terminal and the auxiliary communication terminals according to the embodiment of the present disclosure.

First, the multi-terminal communication service apparatus 300 actively determines the use or non-use of the mobile communication service in the main communication terminal 100 or the auxiliary communication terminal 210, 220 or 230 regardless of the request from the main communication terminal 100 or the auxiliary communication terminal 210, 220 or 230. For example, when the main communication terminal 100 or the auxiliary communication terminal 210, 220 or 230 uses the mobile communication service, a data service outgoing call or data traffic is generated between the main communication terminal 100 or the auxiliary communication terminal 210, 220 or 230 and the communication network 10 (901 and 903). The service determination unit 320 of the multi-terminal communication service apparatus 300 may determine that the main communication terminal 100 or the auxiliary communication terminal 210, 220 or 230 from which the data service outgoing call or data traffic is generated is using the data communication service.

For example, the use or non-use of the data communication service which can be confirmed depending on the generation of the data service outgoing call or data traffic is detected by a DPI (Deep Packet Inspection) or the like in the communication network 10 and may be grasped by the service determination unit 320 based on the detection result received from the DPI or the like. When the main communication terminal 100 or the auxiliary communication terminal 210, 220 or 230 uses the data communication service, the corresponding charging data is generated by a charging device in the communication network 10. Accordingly, the use or non-use of the data communication service in the main communication terminal 100 or the auxiliary communication terminal 210, 220 or 230 is detected by the charging device in the communication network 10 and may be grasped by the service determination unit 320 based on the detection result received from the charging device or the like (905).

If it is determined that the main communication terminal 100 is in use, the terminal determination unit 330 of the multi-terminal communication service apparatus 300 searches for the identification information of the main communication terminal 100 and the auxiliary communication terminals 210, 220 and 230 pre-registered and stored in pair in the terminal information storage unit 360. Based on the search result, the terminal determination unit 330 determines the auxiliary communication terminal 210, 220 or 230 pre-registered in association with the main communication terminal 100. This may be regarded as a process of determining the communication terminal not using the mobile communication service from the main communication terminal 100 and the auxiliary communication terminal 210, 220 or 230 corresponding thereto (907).

Next, the service changing unit 340 of the multi-terminal communication service apparatus 300 requests the service provisioning server 400 to change or limit the use of the mobile communication service by the auxiliary communication terminal 210, 220 or 230 which has been determined to be registered in association with the main communication terminal 100. That is to say, the service changing unit 340 requests the service provisioning server 400 to restrict outgoing call of one of the auxiliary communication terminal 210, 220 or 230 determined in step 907 and requests the service provisioning server 400 to cancel the forwarding of the incoming call to the corresponding auxiliary communication terminal (909).

Then, the service provisioning server 400 sets a state of restriction of outgoing call through the communication network 10 with respect to the auxiliary communication terminal and sets the main communication terminal 100 so as to be able to perform phone conversation and message/data communication. At this time, the restriction of the outgoing call of the auxiliary communication terminal may be targeted for all or a part of services including a phone conversation service, an SMS, an MMS and a data service. For example, the data service, which has nothing to do with a phone number, may be permitted if such a need arises. In this case, it may be possible to implement a calling plan in such a way that the data use amount is shared by the main communication terminal 100 and the auxiliary communication terminals 210, 220 and 230.

In the case where the incoming call directed to the phone number A allocated to the main communication terminal 100 is forwarded to the temporary phone number B allocated to the auxiliary communication terminal 210, 220 or 230 according to the request of the service changing unit 340, the service provisioning server 400 cancels the forwarding of the incoming call so that a call is received by the phone number A of the main communication terminal 100. The cancellation of the forwarding of the incoming call may be targeted for all the services including a phone conversation service, an SMS, an MMS and the like (911).

In addition, the multi-terminal communication service apparatus 300 may inform the main communication terminal 100 and the auxiliary communication terminals 210, 220 and 230 of the fact that the main communication terminal 100 is using the mobile communication service. The terminal information storage unit 360 may store, record and manage the service state information which indicates the state of limiting the use of the mobile communication service in the corresponding one of the auxiliary communication terminals 210, 220 and 230.

If it is determined in step 905 that the auxiliary communication terminal 210, 220 or 230 is in use, the terminal determination unit 330 of the multi-terminal communication service apparatus 300 searches for the identification information of the main communication terminal 100 and the auxiliary communication terminals 210, 220 and 230 pre-registered and stored in pair in the terminal information storage unit 360. Based on the search result, the terminal determination unit 330 determines the main communication terminal 100 pre-registered in association with the auxiliary communication terminal 210, 220 or 230. This may be regarded as a process of determining the communication terminal not using the mobile communication service from the main communication terminal 100 and the auxiliary communication terminal 210, 220 or 230 corresponding thereto (913).

Next, the service changing unit 340 of the multi-terminal communication service apparatus 300 requests the service provisioning server 400 to change or limit the use of the mobile communication service by the main communication terminal 100 which has been determined to be registered in association with the auxiliary communication terminal 210, 220 or 230. That is to say, the service changing unit 340 requests the service provisioning server 400 to permit outgoing call with respect to one of the auxiliary communication terminal 210, 220 or 230 determined in step 907 and requests the service provisioning server 400 to forward the incoming call to the corresponding auxiliary communication terminal (915).

Then, the service provisioning server 400 cancels the state of restriction of outgoing call through the communication network 10 with respect to the auxiliary communication terminal and sets the main communication terminal 100 so as to be unable to perform phone conversation and message/data communication. At this time, the outgoing call permission to the auxiliary communication terminal may be targeted for all or a part of services including a phone conversation service, an SMS, an MMS and a data service. In this case, the service provisioning server 400 makes sure that the incoming call directed to the phone number A allocated to the main communication terminal 100 is forwarded to the temporary phone number B allocated to the auxiliary communication terminal 210, 220 or 230 according to the request of the service changing unit 340. Such forwarding of incoming call may be targeted for all the services including a phone conversation service, an SMS, an MMS and the like (917).

In addition, the multi-terminal communication service apparatus 300 may inform the main communication terminal 100 and the auxiliary communication terminals 210, 220 and 230 of the fact that the auxiliary communication terminal 210, 220 or 230 is using the mobile communication service. The terminal information storage unit 360 may store, record and manage the service state information which indicates the use state of the mobile communication service in the corresponding one of the auxiliary communication terminals 210, 220 and 230.

Next, if it is determined that the mobile communication service is not used by the auxiliary communication terminals 210, 220 and 230 while limiting the use of the mobile communication service in the main communication terminal 100, the service determination unit 320 of the multi-terminal communication service apparatus 300 requests the service provisioning server 400 to resume the provision of the mobile communication service to the main communication terminal 100. That is to say, the service determination unit 320 requests the service provisioning server 400 to cancel the service limitation imposed on the main communication terminal 100 (919 and 921).

Then, the service provisioning server 400 cancels the forwarding of the incoming call by which the incoming call directed to the phone number A allocated to the main communication terminal 100 is forwarded to the temporary phone number B allocated to the auxiliary communication terminal 210, 220 or 230 according to the request of the service changing unit 340 as in step 911, thereby permitting outgoing call of the main communication terminal 100. Such cancellation of forwarding of the incoming call may be targeted for all the services including a phone conversation service, an SMS, an MMS and the like (9237).

As described above, according to the embodiment of the present disclosure, when providing the mobile communication service to the main communication terminal and at least one auxiliary communication terminal, the main communication terminal and the auxiliary communication terminal are mutually exclusively operated. Thus, the main communication terminal and the auxiliary communication terminal do not individually occupy wireless communication resources for the mobile communication service.

In addition, by using the phone number of the main communication terminal when the auxiliary communication terminal takes the place of the main communication terminal, it is possible to maintain the convenience in use related to the same phone number. By limiting the outgoing call of the main communication terminal, it is possible to prevent in advance the generation of unnecessary communication charges and the possibility of unauthorized use of the main communication terminal by others.

The combinations of respective blocks of block diagrams and respective sequences of a flow diagram attached herein is carried out by computer program instructions which are executed through various computer means and recorded in a non-transitory computer-readable recording medium. Since the computer program instructions is loaded in processors of a general purpose computer, a special purpose computer, or other programmable data processing apparatus, the instructions, carried out by the processor of the computer or other programmable data processing apparatus, create means for performing functions described in the respective blocks of the block diagrams or in the respective sequences of the sequence diagram. Since the computer program instructions, in order to implement functions in specific manner, is stored in a memory unit, which comprises non-transitory computer-readable medium, useable or readable by a computer or a computer aiming for other programmable data processing apparatus, the instruction stored in the memory unit useable or readable by a computer produces manufacturing items including an instruction means for performing functions described in the respective blocks of the block diagrams and in the respective sequences of the sequence diagram. Since the computer program instructions are loaded in a computer or other programmable data processing apparatus, instructions, a series of sequences of which is executed in a computer or other programmable data processing apparatus to create processes executed by a computer to operate a computer or other programmable data processing apparatus, provides operations for executing functions described in the respective blocks of the block diagrams and the respective sequences of the flow diagram. The computer program instructions are also performed by one or more processes or specifically configured hardware (e.g., by one or more application specific integrated circuits or ASIC(s)). The non-transitory computer-readable recording medium includes, for example, a program command, a data file, a data structure and the like solely or in a combined manner. The program command recorded in the medium is a program command specially designed and configured for the present disclosure or a program command known to be used by those skilled in the art of the computer software. The non-transitory computer-readable recording medium includes, for example, magnetic media, such as a hard disk, a floppy disk and a magnetic tape, optical media, such as a CD-ROM and a DVD, magneto-optical media, such as a floptical disk, and hardware devices specially configured to store and execute program commands, such as a ROM, a RAM, a flash memory and the like. The program command includes, for example, high-level language codes that can be executed by a computer using an interpreter or the like, as well as a machine code generated by a compiler. The hardware devices can be configured to operate using one or more software modules in order to perform the operation of the present disclosure, and vice versa. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Moreover, the respective blocks or the respective sequences in the appended drawings indicate some of modules, segments, or codes including at least one executable instruction for executing a specific logical function(s). In several alternative embodiments, it is noted that the functions described in the blocks or the sequences run out of order. For example, two consecutive blocks and sequences are substantially executed simultaneously or often in reverse order according to corresponding functions.

The explanation as set forth above is merely described a technical idea of the exemplary embodiments of the present disclosure, and it will be understood by those skilled in the art to which this disclosure belongs that various changes and modifications is made without departing from the scope and spirit of the claimed invention as disclosed in the accompanying claims. Therefore, the exemplary embodiments disclosed herein are not used to limit the technical idea of the present disclosure, but to explain the present disclosure. The scope of the claimed invention is to be determined by not only the following claims but also their equivalents. Specific terms used in this disclosure and drawings are used for illustrative purposes and not to be considered as limitations of the present disclosure. Therefore, the scope of the claimed invention is construed as defined in the following claims and changes, modifications and equivalents that fall within the technical idea of the present disclosure are intended to be embraced by the scope of the claimed invention.

What is claimed is:

1. An apparatus for multi-terminal communication service, comprising:
    a service determination unit configured to determine whether a mobile communication service for using a first communication terminal, which is paired with a second communication terminal to perform the multi-terminal communication service, is used or not, wherein the first communication terminal is pre-registered to be paired with the second communication terminal and wherein the mobile communication service includes a data communication service and the use or non-use of the data communication service is determined based on information from a DPI (Deep Packet Inspection) or a charging device;
    a terminal determination unit configured to determine whether the second communication terminal is identified in pair to be associated with the first communication terminal when the first communication terminal is determined to be used; and
    a service changing unit configured to change a type of the mobile communication service by using the first communication terminal and limiting use of the second communication terminal based on the determination of whether the second communication terminal is identified in pair to be associated with the first communication terminal in case that the data communication service of the first communication terminal is determined as being used.

2. The apparatus of claim 1, further comprising:
    a service registration unit configured to pre-register identification information of the second communication terminal and identification information of the first communication terminal in association with each other.

3. The apparatus of claim 1, wherein the second communication terminal is a main communication terminal and the first communication terminal is an auxiliary communication terminal paired with the main communication terminal, and wherein the service changing unit is configured to forward an incoming call directed to a phone number allocated to the main communication terminal to a phone number allocated to the auxiliary communication terminal.

4. The apparatus of claim 1, wherein the second communication terminal is a main communication terminal and the first communication terminal is an auxiliary communication terminal paired with the main communication terminal, and wherein the service changing unit is configured to alter a calling number of an outgoing call generated in the auxiliary communication terminal to a phone number allocated to the main communication terminal such that the outgoing call originated by the auxiliary communication terminal is made through the phone number of the main communication terminal.

5. The apparatus of claim 1, wherein the second communication terminal is a main communication terminal and the first communication terminal is an auxiliary communication terminal paired with the main communication terminal, and wherein the service changing unit is configured to resume provision of the mobile communication service to the main communication terminal by releasing the limiting of the use of the main communication terminal when the service determination unit determines that the auxiliary communication terminal is not using the mobile communication service, while changing the type of the mobile communication service by the main communication terminal.

6. The apparatus of claim 1, further comprising:
    a synchronization unit configured to match call records or message records of the second communication terminal to those of the first communication terminal respectively when the type of the mobile communication service provided to the second communication terminal or the first communication terminal has been changed.

7. The apparatus of claim 1, wherein the second communication terminal is a main communication terminal and the first communication terminal is an auxiliary communication terminal paired with the main communication terminal.

8. A method for multi-terminal communication service performed by a processor of an apparatus for the multi-terminal communication service, the method comprising:
    determining whether a mobile communication service for using a first communication terminal, which is paired with a second communication terminal to perform the multi-terminal communication service, is used or not, wherein the first communication terminal is pre-registered to be paired with the second communication terminal and wherein the mobile communication service includes a data communication service and the use or non-use of the data communication service is determined based on information from a DPI (Deep Packet Inspection) or a charging device;
    determining whether the second communication terminal is identified in pair to be associated with the first communication terminal when the first communication terminal is determined to be used; and
    changing a type of the mobile communication service by using the first communication terminal and limiting use of the second communication terminal based on the determination of whether the second communication terminal is identified in pair to be associated with the first communication terminal in case that the data communication service of the first communication terminal is determined as being used.

9. The method of claim 8, further comprising:
pre-registering identification information of the second communication terminal and identification information of the first communication terminal in association with each other.

10. The method of claim 8, wherein the second communication terminal is a main communication terminal and the first communication terminal is an auxiliary communication terminal paired with the main communication terminal, and wherein the changing the type of the mobile communication service includes forwarding an incoming call directed to a phone number allocated to the main communication terminal to a phone number allocated to the auxiliary communication terminal.

11. The method of claim 8, wherein the second communication terminal is a main communication terminal and the first communication terminal is an auxiliary communication terminal paired with the main communication terminal, and wherein the changing the type of the mobile communication service includes altering a calling number of an outgoing call generated in the auxiliary communication terminal to a phone number allocated to the main communication terminal such that the outgoing call originated by the auxiliary communication terminal is made through the phone number of the main communication terminal.

12. The method of claim 8, wherein the second communication terminal is a main communication terminal and the first communication terminal is an auxiliary communication terminal paired with the main communication terminal, and wherein the changing the type of the mobile communication service includes resuming provision of the mobile communication service to the main communication terminal by releasing the limiting of the use of the main communication terminal when it is determined that the auxiliary communication terminal is not using the mobile communication service, while changing the type of the mobile communication service by the main communication terminal.

13. The method of claim 8, further comprising:
matching call records or message records of the second communication terminal to those of the first communication terminal respectively when the type of the mobile communication service provided to the second communication terminal or the first communication terminal has been changed.

* * * * *